(12) United States Patent
Huang et al.

(10) Patent No.: US 7,768,756 B2
(45) Date of Patent: Aug. 3, 2010

(54) LEAKAGE CURRENT PROTECTION CIRCUIT

(75) Inventors: Wei-Han Huang, Roseville, CA (US); Anys Bacha, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 11/741,520

(22) Filed: Apr. 27, 2007

(65) Prior Publication Data

US 2008/0265682 A1 Oct. 30, 2008

(51) Int. Cl.
*H02H 3/24* (2006.01)
*H02J 9/00* (2006.01)
*H02J 1/00* (2006.01)

(52) U.S. Cl. .............. 361/92; 307/64; 307/66; 307/80

(58) Field of Classification Search .......... 361/93, 361/92; 307/80, 64, 66
See application file for complete search history.

(56) References Cited

U.S. PATENT DOCUMENTS

| | | | |
|---|---|---|---|
| 4,638,175 A * | 1/1987 | Bradford et al. | ............ 307/64 |
| 4,841,160 A | 6/1989 | Yon et al. | |
| 4,908,790 A * | 3/1990 | Little et al. | .................. 714/14 |
| 5,451,822 A | 9/1995 | Bechtel et al. | |
| 6,404,261 B1 | 6/2002 | Grover et al. | |
| 6,642,750 B1 * | 11/2003 | Egan | ......................... 327/63 |
| 6,822,423 B2 | 11/2004 | Yau et al. | |
| 6,954,103 B2 | 10/2005 | Yamauchi et al. | |
| 2002/0186040 A1 | 12/2002 | Ooishi | |
| 2005/0036248 A1 | 2/2005 | Klikic et al. | |
| 2005/0258805 A1 | 11/2005 | Thomas et al. | |
| 2007/0030617 A1 | 2/2007 | Derckx et al. | |
| 2007/0053217 A1 | 3/2007 | Darroman | |

* cited by examiner

*Primary Examiner*—Robert DeBeradinis
*Assistant Examiner*—Scott Bauer

(57) ABSTRACT

Systems and methods are provided for substantially mitigating leakage current. One embodiment includes an integrated circuit (IC). The IC comprises a monitoring circuit configured to control switching of one of a first voltage source and a second voltage source to an output. The IC also comprises a leakage current protection circuit configured to substantially mitigate leakage current flow between the first voltage source and the second voltage source due to an undershoot condition caused by the switching between the first and second voltage sources to the output.

20 Claims, 1 Drawing Sheet

LEAKAGE CURRENT PROTECTION CIRCUIT

BACKGROUND

The market for consumer electronics is constantly improving to meet consumer demands. One such demand is an increasing demand for smaller circuit packages that consume less power for the purpose of conserving battery-life, such as for use in portable electronic devices like laptop computers and wireless communication devices. Such portable electronic devices typically implement switching circuitry that switches between a power supply, such as providing converted DC power from an AC wall outlet, and one or more batteries. Upon switching to battery power, an undershoot condition may occur, such that a negative voltage spike may manifest at a node from which the DC power supply voltage was provided. A large enough negative voltage spike may cause a switching transistor to unintentionally activate due to a large avalanche breakdown voltage, causing leakage current to flow from the battery to the negative voltage power supply node. As a result, the life of the battery can be significantly shortened.

DETAILED DESCRIPTION

Figure 1:
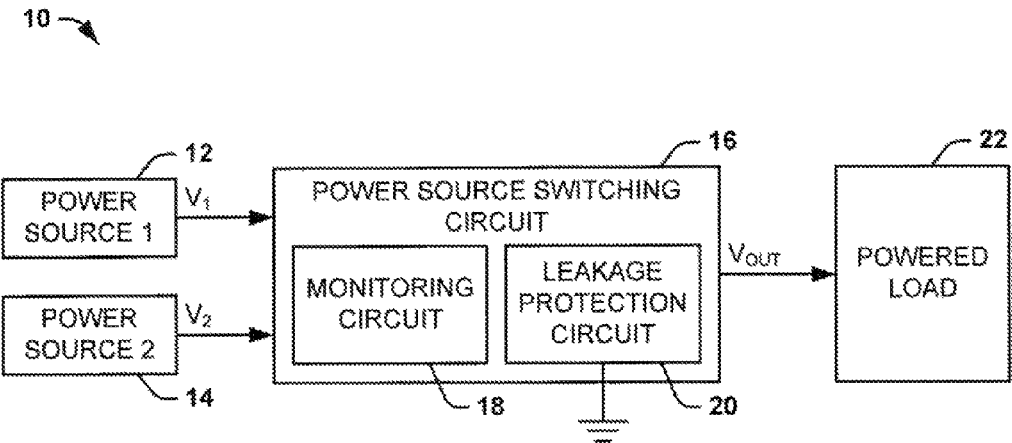
FIG. 1 depicts an embodiment of a system for providing power to a load.

FIG. 1 depicts an embodiment of a system 10 for providing power to a load. The system 10 includes a first power supply 12 configured to provide a voltage $V_1$ and a second power supply 14 configured to provide a second voltage $V_2$. As an example, the first power source 12 could be a DC power supply and the second power source 14 could be a battery. Thus, the system 10 could be implemented in a portable electronic device, such as a lap-top computer, a personal organizer, and/or a wireless communication device.

The voltage $V_1$ and the voltage $V_2$ are each provided to a power source switching circuit 16. The power source switching circuit 16 can be configured in a single integrated circuit (IC), and includes a monitoring circuit 18 and a leakage protection circuit 20. The monitoring circuit 18 is configured to monitor the relative magnitude of the voltage $V_1$ and the voltage $V_2$, and to provide either the voltage $V_1$ or the voltage $V_2$ as a voltage $V_{OUT}$ that is output from the power source switching circuit 16. As an example, the first power source 12 could be a DC power supply configured to provide approximately 5 volts and the second power source 14 could be a battery configured to provide approximately 3 volts. Thus, the power source switching circuit 16 could switch the voltage $V_1$ to the output to provide the voltage $V_{OUT}$ at approximately 5 volts. However, upon the first power source 12 being disconnected (e.g., unplugged), the power sources switching circuit 16 could switch the voltage $V_2$ to the output to provide a voltage $V_{OUT}$ at approximately 3 volts. The voltage $V_{OUT}$ is provided to a powered load 22, which could be any of a variety of electronic components for which the voltage $V_1$ or the voltage $V_2$ is intended to provide power.

Upon disconnection of the first voltage source 12 or the second voltage source 14, an undershoot condition may occur in which the respective voltage $V_1$ or voltage $V_2$ exhibits a negative voltage spike. As an example, upon disconnecting a DC power supply from an AC wall outlet, the DC power supply may provide a monetary negative voltage pulse. Upon the negative voltage having a large enough magnitude, one or more deactivated switches (e.g., transistors) may experience a breakdown (i.e., avalanche) condition. For example, upon the negative voltage being approximately −0.7 to −1.0 volts, a deactivated transistor may have a drain-to-source voltage $V_{DS}$ that is sufficient to trigger a breakdown voltage that activates the transistor. Therefore, current that is provided from the active power supply, such as a battery, may leak through the activated transistor to the deactivated power supply, such as the disconnected DC power supply, in addition to being provided to the output of the power source switching circuit 16. As a result, power is wasted, such that battery life can be shortened if current from a battery leaks into the other power supply.

The leakage protecting circuit 20 is configured to substantially mitigate leakage current flow from one of the power sources 12 and 14 to the other. As an example, the leakage protection circuit 20 can include a switch that coupes and intermediate node coupled to the respective one of the voltages $V_1$ and $V_2$ to ground upon the power source switching circuit 16 activating the other of the power sources 12 and 14. For example, upon the power source switching circuit 16 providing the voltage $V_2$ from the second power source 14 as the output voltage $V_{OUT}$, the leakage protection circuit 20 can couple an intermediate node coupled to the voltage $V_1$ to ground. Therefore, an input of a switch that couples the voltage $V_1$ to the voltage $V_{OUT}$ can have a voltage potential of zero, as opposed to being negative, thus mitigating the chance of a breakdown conditions of the switch. In addition, the leakage protection circuit 20 can also include a diode configured to substantially prevent current flow from one of the power sources 12 and 14 to the other. For example, the diode can be configured such that an undesired leakage current cannot flow in a reverse bias direction through the diode to the deactivated power supply, even upon the deactivated power supply providing a negative voltage.

It is to be understood that the system 10 is not intended to be limited to the example of FIG. 1. For example, the system 10 is demonstrated in a simplistic manner for the sake of explanation, such that one or more additional components can be included in the system 10. As another example, the system 10 is not limited to two power sources, but that the power source switching circuit 16 could switch between a number of different power sources. Accordingly, the system 10 can be configured in any of a variety of different ways.

Figure 2:
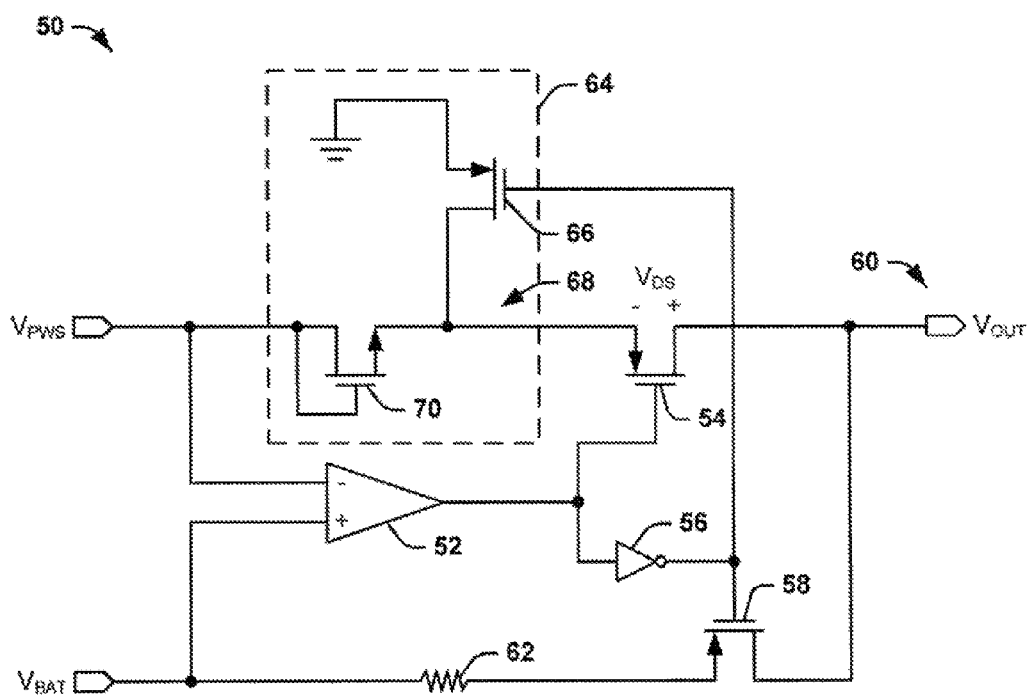
FIG. 2 depicts an embodiment of a power source switch that protects against leakage current.

FIG. 2 depicts an embodiment of a power source switching circuit 50. The power source switching circuit 50 can be substantially similar to the power source switching circuit 16 in the example of FIG. 1. In the example of FIG. 2, the powder source switching circuit 50 receives a voltage $V_{PWS}$, such as from a DC power supply (not shown), and a voltage $V_{BAT}$, such as from a battery (not shown). Therefore, the power source switching circuit 50 can be configured to switch between the voltage $V_{PWS}$ and the voltage $V_{BAT}$ to provide the respective voltage as an output voltage $V_{OUT}$ to a powered load, such as the powered load 22 in the example of FIG. 1.

The voltage $V_{PWS}$ and the voltage $V_{BAT}$ are each provided to a comparator 52, with the voltage $V_{PWS}$ being provided to an inverting input and the voltage $V_{BAT}$ being provided to a non-inverting input. As a result, the comparator 52 is configured to provide a logic-low (i.e., logic 0) output upon the voltage $V_{PWS}$ being greater than the voltage $V_{BAT}$, and is configured to provide a logic-high (i.e., logic 1) output upon the voltage $V_{BAT}$ being greater than the voltage $V_{PWS}$. The voltage $V_{PWS}$ can be approximately 5 volts, and the voltage $V_{BAT}$ can be approximately 3 volts, such that the comparator 52 can provide the logic-low output when the DC power supply is activated to provide the approximately 5 volts. Upon the DC power supply being deactivated, the comparator 52 can thus provide the logic-high output.

The comparator 52 provides an output to a first P-type field effect transistor (P-FET) 54 and to an inverter 56 that is coupled to a second P-FET 58. The first P-FET 54 interconnects the voltage $V_{PWS}$ and an output 60 of the power source switching circuit 50, with a source coupled to the voltage $V_{PWS}$ and a drain coupled to the output 60. Therefore, upon the voltage $V_{PWS}$ being greater than the voltage $V_{BAT}$, the logic-low output from the comparator 52 activates the first P-FET 54 and deactivates the second P-FET 58 based on the logic-high signal output from the inverter 56. As a result, the voltage $V_{PWS}$ is coupled to the output 60, thus providing the output voltage $V_{OUT}$ that is substantially equal to the voltage $V_{PWS}$.

The second P-FET 58 interconnects the voltage $V_{BAT}$ and the output 60 of the power source switching circuit 50, with a source coupled to the voltage $V_{BAT}$ and a drain coupled to the output 60. Therefore, upon the voltage $V_{BAT}$ being greater than the voltage $V_{PWS}$, the logic-high output from the comparator 52 deactivate the first P-FET 54 and activates the second P-FET 58 based on the logic-low signal output from the inverter 56. As a result, the voltage $V_{BAT}$ is coupled to the output 60, thus providing the output voltage $V_{OUT}$ that is substantially equal to the voltage $V_{BAT}$. In the example of FIG. 2, current provided from the voltage $V_{BAT}$ flows through a current limiting resistor 62. The comparator 52, the inverter 56, the current limiting resistor 62, and the P-FETs 54 and 58 can thus constitute a monitoring circuit, similar to the monitoring circuit 18 in the example of FIG. 1.

As described above in the example of FIG. 1, upon disconnection of the DC power supply, an undershoot condition may occur in which the voltage $V_{PWS}$ exhibits a negative voltage spike. At substantially the same time, the voltage $V_{BAT}$ is provided to the output 60, such that the voltage $V_{OUT}$ is substantially equal to the voltage $V_{BAT}$. Upon the negative voltage spike at the voltage $V_{PWS}$ having a large enough magnitude (e.g., approximately −0.7 to −1.0 volts), the voltage $V_{DS}$ of the P-FET 54 can be substantially equal to the voltage $V_{BAT}$ plus an absolute value of the negative voltage of $V_{PWS}$. Therefore, the P-FET 54 may experience a breakdown condition and substantially activate, despite the comparator 52 providing an output (i.e., logic-high) that is intended to deactivate the P-FET 54. As a result, current that is provided from the voltage $V_{BAT}$ can be provided to the output 60 and can leak through the P-FET 54 to the negative voltage $V_{PWS}$. As a result, the battery that provides the voltage $V_{BAT}$ can experience a shortened battery life based on the wasted power than is provided through the leakage current.

To substantially mitigate the leakage current through the P-FET 54, the power source switching circuit 50 includes a leakage protection circuit 64. The leakage protection circuit 64 can be configured substantially similarly to the leakage protection circuit 20 in the example of FIG. 1. The leakage protection circuit 64 includes a third P-FET 66 that interconnects ground and a node 68 that is coupled to the voltage $V_{PWS}$, with a drain coupled to the node 68 and a source coupled to ground. The third P-FET 66 has a gate that is coupled to the output of the inverter 56, such that the third P-FET 66 is activated substantially concurrently with the second P-FET 58. Therefore, upon the comparator 52 outputting a logic-high signal, the second P-FET 58 activates to couple the voltage $V_{BAT}$ to the output 60 and the third P-FET 66 activates to couple the node 68 to ground. If the voltage $V_{PWS}$ is negative, the third P-FET 66 thus raises the voltage $V_{PWS}$ to zero, such that the voltage $V_{DS}$ of the first P-FET 54 decreases. As a result, the first P-FET 54 may not experience a breakdown condition, and thus may not activate to pass leakage current from the voltage $V_{BAT}$ to the voltage $V_{PWS}$.

It is be understood that, due to the configuration of the third P-type FED 66, the logic-low output signal of the inverter 56 that is sufficient to activate the third P-FET 66 is less than zero. Thus, a negative voltage rail (not shown) that is provided to power the inverter 56 and/or the comparator 52 can be negative (e.g., −0.7 to −1.0 volts) to provide a negative logic-low output signal of the inverter 52 that provides a sufficient $V_{SG}$ voltage to activate the third P-FED 66 to increase the voltage of the node 68 to ground. As an alternative, it is to be understood that the leakage protection circuit 64 is not limited to coupling the node 68 to round, but could instead raise the voltage at the node 68 to a positive voltage (e.g., 0.7 to 1.0 volts). As such, the logic-low output signal of the inverter 56 could be zero to provide a sufficient $V_{SG}$ voltage to activate the third P-FET 66 to increase the voltage of the node 68 to the positive source voltage of the third P-FET 66.

In addition to the third P-FET 66, the leakage protection circuit 64 also includes an N-FET 70 having a gate and a drain coupled together, and a source coupled to the node 68, such that the N-FET 70 is diode-coupled. Therefore, the N-FET 70 is configured as a diode having an anode coupled to the voltage $V_{PWS}$ and a cathode coupled to the output 60. The N-FET 70 is configured to substantially prevent current flow from the output 60 to the voltage $V_{PWS}$. Specifically, current flow from the node 68 to the voltage $V_{PWS}$ is in a reverse-bias direction for the diode-configured N-FET 70. Therefore, in the vent that the first P-FET 58 activates before the third P-FET 66, or in the event that the voltage $V_{BAT}$ is great enough relative to ground to still cause a breakdown condition of the first P-FET 54, the diode-configured N-FET 70 substantially prevents leakage current from flowing from the output 60 through the first P-FET 54 to the voltage $V_{PWS}$. In addition, the diode-connected N-FET 70 also substantially prevents current flow from ground to the negative $V_{PWS}$ upon activation of the third P-FET 66.

It is to be understood that the power source switching circuit 50 is not intended to be limited to the example of FIG. 2. For example, the power source switching circuit 50 is demonstrated in the example of FIG. 2 in a simplistic manner for the sake of explanation. As such, the power source switching circuit 50 can include any of a variety of additional circuit components. As an example, the power source switching circuit 50 can include additional components to assist in the coordination of the relative switching times between the first P-FET 54 and the second P-FET 58. As another example, the power source switching circuit 50 is not intended to be limited to two power sources corresponding to the voltages $V_{PWS}$ and $V_{BAT}$, but could include additional components to switch between three or more separate voltages. Furthermore, the voltage $V_{BAT}$ is not intended to be limited to voltage from a battery, but could be a separate DC power supply, such that leakage current is undesirable with regarded to power consumption of the electronic device in which the power source switching circuit 50 is included. Accordingly, the power source switching circuit 50 can be configured in any of a variety of ways.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. An integrated circuit (IC) comprising:
   a first transistor configured to couple a first voltage source from a first node of the first transistor to a second node of the first transistor;
   a second transistor configured to couple a second voltage source from a first node of the second transistor to a second node of the second transistor;
   a monitoring circuit configured to control the first and second transistors to control switching of one of the first voltage source and the second voltage source to an output; and
   a leakage current protection circuit configured to substantially mitigate leakage current flow between the first voltage source and the output second voltage due to an undershoot condition at the first voltage source,
   wherein the leakage current protection circuit comprises a third transistor controlled by the monitoring circuit, the third transistor configured to switch the first node of the first transistor to a fixed voltage potential upon the second voltage source being switched to the output, wherein the third transistor is coupled between the fixed voltage potential and the first node of the first transistor.

2. The IC of claim 1, wherein the third transistor is configured as a P-type transistor that is activated by a control signal output from the monitoring circuit, the control signal having a voltage that is less than the voltage potential to which the first voltage source is switched.

3. The IC of claim 1, wherein the leakage current protection circuit further comprises a diode interconnected between the first node of the first transistor and the first voltage source, the diode being configured to substantially prevent a current flow from the fixed voltage potential of the first voltage source.

4. The IC of claim 3, wherein the diode comprises a diode-coupled transistor.

5. The IC of claim 1, wherein the leakage current protection circuit comprises a diode having an anode coupled to the first voltage source and a cathode coupled to the output through the first transistor, the diode being configured to substantially prevent current flow from the output to the first voltage source upon occurrence of the undershoot condition.

6. The IC of claim 5, wherein the diode comprises a diode-coupled transistor.

7. The IC of claim 1, wherein the first voltage source is a power supply and the second voltage source comprises a battery.

8. The IC of claim 1, further comprising a current limiting resistor configured to limit an amount of current provided from the second voltage source to the output.

9. The IC of claim 1, wherein the monitoring circuit comprises:
   a comparator configured to compare relative magnitudes of the first voltage source and the second voltage source; and
   an inverter having an input connected to an output of the comparator, wherein the output of the comparator is further connected to a gate of one of the first and second transistors, and an output of the inverter is connected to a gate of the other one of the first and second transistors.

10. The IC of claim 1, wherein the first node of the first transistor is a drain or source of the first transistor.

11. An apparatus comprising:
    a comparator configured to compare relative magnitudes of a power supply voltage and a battery voltage, the comparator configured to output a first output state if the power supply voltage is greater than the battery voltage and to output a second output state if the battery voltage is greater than the power supply voltage;
    a first switch configured to couple the power supply voltage to an output in response to the first output state of the comparator and decouple the power supply voltage from the output in response to the second output state of the comparator, wherein the power supply voltage is coupled from a first node of the switch to a second node of the switch for provision to the output;
    a second switch configured to couple the battery voltage to the output in response to the second output state of the comparator and decouple the battery voltage from the output in response to the first output state of the comparator; and
    a leakage current protection circuit configured to substantially prevent a breakdown condition of the first switch upon an undershoot condition caused by the battery voltage being switched to the output and the power supply voltage being decoupled from the output,
    wherein the leakage current protection circuit comprises a third switch controlled by the comparator, the third switch configured to switch the first node of the first switch to a fixed voltage potential upon the battery voltage being switched to the output, wherein the first node of the first switch is switched to the fixed voltage potential through the third switch.

12. The apparatus of claim 11, wherein the third switch is configured as a P-type transistor that is activated substantially concurrently with the second switch.

13. The apparatus of claim 11, wherein the leakage current protection circuit further comprises a diode interconnected between the first node of the first switch and the power supply voltage, the diode being configured to prevent a current flow from the fixed voltage potential to a power supply from which the power supply voltage is provided.

14. The apparatus of claim 13, wherein the diode comprises a diode-coupled transistor.

15. The apparatus of claim 11, wherein the leakage current protection circuit comprises a diode having an anode coupled to the power supply voltage and a cathode coupled to the output through the first switch, the diode being configured to substantially prevent a current flow from the output to a power supply from which the power supply voltage is provided upon occurrence of the undershoot condition.

16. The apparatus of claim 15, wherein the diode comprises a diode-coupled transistor.

17. The apparatus of claim 11, wherein the first switch includes a first transistor, and wherein the first node of the first switch is a drain or source of the first transistor.

18. A method comprising:
    switching, through a first switch, a first voltage source to an output upon the first voltage source being greater than a second voltage source, wherein the first voltage source is coupled from a first node of the first switch to a second node of the first switch for provision to the output;
    switching, through a second switch, the second voltage source to an output upon the second voltage source being greater than the first voltage source, wherein the first switch and second switch are controlled by a monitoring circuit that compares the first voltage source to the second voltage source;

holding the first node of the first switch at a fixed voltage potential upon the second voltage source being switched to the output, wherein the first node of the first switch is held at the fixed voltage potential by a third switch coupled between the fixed voltage potential and the first node of the first switch, and wherein the third switch is controlled by the monitoring circuit; and substantially mitigating current flow from the fixed voltage potential to the first voltage source.

19. The method of claim 18, wherein holding the first node of the first switch at the fixed voltage potential substantially prevents a breakdown condition of the first switch.

20. The method of claim 18, wherein the first switch includes a first transistor, and wherein the first node of the first switch is a drain or source of the first transistor.

* * * * *

UNITED STATES PATENT AND TRADEMARK OFFICE
CERTIFICATE OF CORRECTION

| | | |
|---|---|---|
| PATENT NO. | : 7,768,756 B2 | |
| APPLICATION NO. | : 11/741520 | |
| DATED | : August 3, 2010 | |
| INVENTOR(S) | : Wei-Han Huang et al. | |

It is certified that error appears in the above-identified patent and that said Letters Patent is hereby corrected as shown below:

In column 5, line 22, in Claim 1, after "output" delete "second voltage".

Signed and Sealed this
First Day of March, 2011

David J. Kappos
*Director of the United States Patent and Trademark Office*